United States Patent
Wong et al.

(10) Patent No.: US 11,314,024 B2
(45) Date of Patent: Apr. 26, 2022

(54) LEVER ACTUATED LATCH ARM FOR RELEASING A FIBER OPTIC CONNECTOR FROM A RECEPTACLE PORT AND METHOD OF USE

(71) Applicant: Senko Advanced Components, Inc., Marlborough, MA (US)

(72) Inventors: Kim Man Wong, Kowloon (HK); Man Ming Ho, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/900,218

(22) Filed: Jun. 12, 2020

(65) Prior Publication Data
US 2020/0393630 A1 Dec. 17, 2020

Related U.S. Application Data

(60) Provisional application No. 62/861,013, filed on Jun. 13, 2019.

(51) Int. Cl.
*G02B 6/38* (2006.01)

(52) U.S. Cl.
CPC ......... *G02B 6/3898* (2013.01); *G02B 6/3893* (2013.01)

(58) Field of Classification Search
CPC .. G02B 6/3825; G02B 6/3893; G02B 6/3879; G02B 6/3887; G02B 6/3885; G02B 6/387; G02B 6/3821; G02B 6/3898; G02B 6/3831; G02B 6/3851; G02B 6/3895; G02B 6/26; G02B 6/36; G02B 6/3845; G02B 6/3846; G02B 6/3849; G02B 6/3874;
(Continued)

(56) References Cited

U.S. PATENT DOCUMENTS 3,721,945 A 3/1973 Hulls
4,150,790 A 4/1979 Potter
(Continued)

FOREIGN PATENT DOCUMENTS

CA 2495693 A1 4/2004
CN 2836038 Y 11/2006
(Continued)

OTHER PUBLICATIONS

International Search Report and Written Opinion dated Sep. 10, 2020 from corresponding International Application No. PCT/US20/37553, International Filing Date Jun. 12, 2020, pp. 11.
(Continued)

*Primary Examiner* — Ryan A Lepisto
*Assistant Examiner* — Erin D Chiem

(57) ABSTRACT

A fiber optic connector deploys a latch lever release with an elastic rib. When the latch lever release is depressed down or toward the optical axis of the connector, a hook seated within a recess of the connector outer housing, the hook is lifted out of the recess thereby allowing the connector to be removed from the adapter port. A pivot point is formed between the main body of the latch lever release and the connector outer housing. Depressing the latch lever release distal of the pivot point at the trigger portion displaces the hook from the connector thereby allowing the user to remove the connector from a receptacle port, such as an adapter port.

20 Claims, 12 Drawing Sheets

(58) Field of Classification Search
CPC .. G02B 6/3878; G02B 6/3897; G02B 6/4284; G02B 6/4282
See application file for complete search history.

(56) References Cited

U.S. PATENT DOCUMENTS

| | | |
|---|---|---|
| 4,240,695 A | 12/1980 | Evans |
| 4,327,964 A | 5/1982 | Haesly et al. |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber et al. |
| 5,026,138 A | 6/1991 | Boudreau |
| 5,031,981 A | 7/1991 | Peterson |
| 5,041,025 A | 8/1991 | Haitmanek |
| D323,143 S | 1/1992 | Ohkura et al. |
| 5,101,463 A | 3/1992 | Cubukciyan |
| 5,146,813 A | 9/1992 | Stanfill |
| 5,159,652 A | 10/1992 | Grassin D'Alphonse |
| 5,212,752 A | 5/1993 | Stephenson et al. |
| 5,265,181 A | 11/1993 | Chang |
| 5,289,554 A | 2/1994 | Cubukciyan et al. |
| 5,315,679 A | 5/1994 | Baldwin |
| 5,317,663 A | 5/1994 | Beard et al. |
| 5,321,784 A | 6/1994 | Cubukciyan |
| 5,335,301 A | 8/1994 | Newman et al. |
| 5,348,487 A | 9/1994 | Marazzi et al. |
| 5,418,875 A | 5/1995 | Nakano |
| 5,444,806 A | 8/1995 | de Marchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,602,951 A | 2/1997 | Shiota |
| 5,684,903 A | 11/1997 | Kyomasu et al. |
| 5,687,268 A | 11/1997 | Stephenson et al. |
| 5,781,681 A | 7/1998 | Manning |
| 5,845,036 A | 12/1998 | De Marchi |
| 5,862,282 A | 1/1999 | Matsuura |
| 5,915,987 A | 6/1999 | Reed |
| 5,930,426 A | 7/1999 | Harting |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,095,862 A | 8/2000 | Doye |
| D431,124 S | 9/2000 | Natuzzi et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,240,228 B1 | 5/2001 | Chen |
| 6,247,849 B1 | 6/2001 | Liu |
| 6,250,817 B1 | 6/2001 | Lampert |
| 6,276,840 B1 | 8/2001 | Weiss |
| 6,364,537 B1 | 4/2002 | Maynard |
| 6,379,052 B1 | 4/2002 | de Jong |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy et al. |
| 6,478,472 B1 | 11/2002 | Anderson et al. |
| 6,485,194 B1 | 11/2002 | Shirakawa |
| 6,527,450 B1 | 3/2003 | Miyachi |
| 6,530,696 B1 | 3/2003 | Ueda |
| 6,551,117 B2 | 4/2003 | Poplawski et al. |
| 6,565,262 B2 | 5/2003 | Childers |
| 6,572,276 B1 | 6/2003 | Theis |
| 6,579,014 B2 | 6/2003 | Melton et al. |
| 6,585,194 B1 | 7/2003 | Brushwood |
| 6,634,796 B2 | 10/2003 | de Jong |
| 6,634,801 B1 | 10/2003 | Waldron et al. |
| 6,648,520 B2 | 11/2003 | McDonald et al. |
| 6,668,113 B2 | 12/2003 | Togami |
| 6,682,228 B2 | 1/2004 | Ralhnam et al. |
| 6,685,362 B2 | 2/2004 | Burkholder et al. |
| 6,695,486 B1 | 2/2004 | Falkenberg |
| 6,817,272 B2 | 11/2004 | Holland |
| 6,854,894 B1 | 2/2005 | Yunker et al. |
| 6,869,227 B2 | 3/2005 | Del Grosso |
| 6,872,039 B2 | 3/2005 | Baus et al. |
| 6,935,789 B2 | 8/2005 | Gross, III et al. |
| 7,036,993 B2 | 5/2006 | Luther |
| 7,052,186 B1 | 5/2006 | Bates |
| 7,077,576 B2 | 7/2006 | Luther |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,264,402 B2 | 9/2007 | Theuerkorn |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant |
| 7,510,335 B1 | 3/2009 | Su et al. |
| 7,513,695 B1 | 4/2009 | Lin et al. |
| 7,540,666 B2 | 6/2009 | Luther |
| 7,561,775 B2 | 7/2009 | Lin et al. |
| 7,588,373 B1 | 9/2009 | Sato |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,712,970 B1 | 5/2010 | Lee |
| 7,717,625 B2 | 5/2010 | Margolin |
| 7,824,113 B2 | 11/2010 | Wong et al. |
| 7,837,395 B2 | 11/2010 | Lin et al. |
| D641,708 S | 7/2011 | Yaamauchi |
| 8,083,450 B1 | 12/2011 | Smith et al. |
| 8,152,385 B2 | 4/2012 | de Jong |
| 8,186,890 B2 | 5/2012 | Lu |
| 8,192,091 B2 | 6/2012 | Hsu et al. |
| 8,202,009 B2 | 6/2012 | Lin et al. |
| 8,221,007 B2 | 7/2012 | Peterhans |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,414,196 B2 | 4/2013 | Lu |
| 8,465,317 B2 * | 6/2013 | Gniadek ............ G02B 6/3898 439/344 |
| 8,534,928 B2 | 9/2013 | Cooke |
| 8,550,728 B2 | 10/2013 | Takahashi |
| 8,556,645 B2 | 10/2013 | Crain |
| 8,559,781 B2 | 10/2013 | Childers |
| 8,622,634 B2 | 1/2014 | Arnold |

(56) References Cited

U.S. PATENT DOCUMENTS

| | | | |
|---|---|---|---|
| 8,636,424 B2 | 1/2014 | Kuffel et al. | |
| 8,651,749 B2 | 2/2014 | Dainese Junior et al. | |
| 8,676,022 B2 | 3/2014 | Jones | |
| 8,678,670 B2 | 3/2014 | Takahashi | |
| 8,727,638 B2 | 5/2014 | Lee | |
| 8,757,894 B2 | 5/2014 | Katoh | |
| 8,764,308 B2 | 7/2014 | Irwin | |
| 8,770,863 B2 | 7/2014 | Cooke et al. | |
| 8,869,661 B2 | 10/2014 | Opstad | |
| 9,004,778 B2 * | 4/2015 | Isenhour | G02B 6/3831 385/77 |
| 9,052,474 B2 | 6/2015 | Jiang | |
| 9,063,296 B2 | 6/2015 | Jiang | |
| 9,250,402 B2 | 2/2016 | Ishii | |
| 9,310,569 B2 | 4/2016 | Lee | |
| 9,366,829 B2 | 6/2016 | Czosnowski | |
| 9,411,110 B2 | 8/2016 | Barnette, Jr. et al. | |
| 9,448,370 B2 | 9/2016 | Xue | |
| 9,465,172 B2 | 10/2016 | Shih | |
| 9,494,744 B2 | 11/2016 | de Jong | |
| 9,548,557 B2 | 1/2017 | Liu | |
| 9,551,842 B2 | 1/2017 | Theuerkorn | |
| 9,557,495 B2 | 1/2017 | Raven | |
| 9,568,686 B2 | 2/2017 | Fewkes et al. | |
| 9,581,768 B1 | 2/2017 | Baca et al. | |
| 9,599,778 B2 | 3/2017 | Wong et al. | |
| 9,625,658 B1 * | 4/2017 | Lin | G02B 6/3879 |
| 9,658,409 B2 | 5/2017 | Gniadek | |
| 9,684,130 B2 | 6/2017 | Veatch | |
| 9,684,136 B2 | 6/2017 | Cline et al. | |
| 9,684,313 B2 | 6/2017 | Chajec | |
| 9,709,753 B1 | 8/2017 | Chang et al. | |
| 9,778,425 B2 | 10/2017 | Nguyen | |
| 9,829,644 B2 | 11/2017 | Nguyen | |
| 9,829,645 B2 | 11/2017 | Good | |
| 9,829,653 B1 | 11/2017 | Nishiguchi | |
| 9,869,825 B2 | 1/2018 | Bailey et al. | |
| 9,880,361 B2 | 1/2018 | Childers | |
| 9,946,035 B2 | 4/2018 | Gustafson | |
| 9,948,370 B2 | 4/2018 | Seok | |
| 9,971,103 B2 | 5/2018 | de Jong | |
| 9,989,711 B2 | 6/2018 | Ott | |
| 10,031,296 B2 | 7/2018 | Good | |
| 10,067,301 B2 | 9/2018 | Murray | |
| 10,107,972 B1 | 10/2018 | Gniadek | |
| 10,114,180 B2 | 10/2018 | Suzic | |
| 10,146,011 B2 | 12/2018 | Nhep | |
| 2002/0168148 A1 | 11/2002 | Gililand | |
| 2002/0172467 A1 | 11/2002 | Anderson et al. | |
| 2002/0191919 A1 | 12/2002 | Nolan | |
| 2003/0053787 A1 | 3/2003 | Lee | |
| 2003/0063862 A1 | 4/2003 | Fillion | |
| 2003/0157825 A1 | 8/2003 | Kane | |
| 2004/0052473 A1 | 3/2004 | Seo | |
| 2004/0109646 A1 | 6/2004 | Anderson | |
| 2004/0161958 A1 | 6/2004 | Togami et al. | |
| 2004/0136657 A1 | 7/2004 | Ngo | |
| 2004/0141693 A1 | 7/2004 | Szilagvi et al. | |
| 2004/0234209 A1 | 11/2004 | Cox et al. | |
| 2004/0247252 A1 | 12/2004 | Ehrenreich | |
| 2005/0111796 A1 | 5/2005 | Matasek et al. | |
| 2005/0141817 A1 | 6/2005 | Yazaki et al. | |
| 2006/0013539 A1 | 1/2006 | Thaler | |
| 2006/0076061 A1 | 4/2006 | Bush | |
| 2006/0089049 A1 | 4/2006 | Sedor | |
| 2006/0127025 A1 | 6/2006 | Haberman | |
| 2006/0153503 A1 | 7/2006 | Suzuki | |
| 2006/0160429 A1 | 7/2006 | Dawiedczyk et al. | |
| 2006/0193562 A1 | 8/2006 | Theuerkorn | |
| 2006/0269194 A1 | 11/2006 | Luther et al. | |
| 2006/0274411 A1 | 12/2006 | Yamauchi | |
| 2007/0025665 A1 | 2/2007 | Dean | |
| 2007/0028409 A1 | 2/2007 | Yamada | |
| 2007/0079854 A1 | 4/2007 | You | |
| 2007/0098329 A1 | 6/2007 | Shimoji et al. | |
| 2007/0149028 A1 | 6/2007 | Yu et al. | |
| 2007/0149062 A1 | 6/2007 | Long et al. | |
| 2007/0230874 A1 | 10/2007 | Lin | |
| 2007/0232115 A1 | 10/2007 | Burke et al. | |
| 2007/0243749 A1 | 10/2007 | Wu | |
| 2008/0008430 A1 | 1/2008 | Kewitsch | |
| 2008/0044137 A1 | 2/2008 | Luther et al. | |
| 2008/0064344 A1 | 2/2008 | Hamadi | |
| 2008/0056647 A1 | 3/2008 | Margolin | |
| 2008/0069501 A1 | 3/2008 | Mudd et al. | |
| 2008/0101757 A1 | 5/2008 | Lin et al. | |
| 2008/0226237 A1 | 9/2008 | O'Riorden et al. | |
| 2008/0267566 A1 | 10/2008 | En Lin | |
| 2009/0022457 A1 | 1/2009 | De Jong et al. | |
| 2009/0028507 A1 | 1/2009 | Jones et al. | |
| 2009/0047818 A1 | 2/2009 | Irwin | |
| 2009/0092360 A1 | 4/2009 | Lin et al. | |
| 2009/0176401 A1 | 7/2009 | Gu | |
| 2009/0196555 A1 | 8/2009 | Lin et al. | |
| 2009/0214162 A1 | 8/2009 | O'Riordan et al. | |
| 2009/0220197 A1 | 9/2009 | Gniadek | |
| 2009/0220200 A1 | 9/2009 | Sheau Tung Wong et al. | |
| 2009/0290839 A1 | 11/2009 | Lin | |
| 2009/0290938 A1 | 11/2009 | Asaoka | |
| 2010/0034502 A1 | 2/2010 | Lu et al. | |
| 2010/0054668 A1 | 3/2010 | Nelson | |
| 2010/0092136 A1 | 4/2010 | Nhep | |
| 2010/0220961 A1 | 9/2010 | De Jong et al. | |
| 2010/0247041 A1 | 9/2010 | Szilagyi | |
| 2010/0061069 A1 | 11/2010 | Cole | |
| 2010/0284656 A1 | 11/2010 | Morra | |
| 2010/0322561 A1 | 12/2010 | Lin et al. | |
| 2011/0044588 A1 | 2/2011 | Larson et al. | |
| 2011/0131801 A1 | 6/2011 | Nelson et al. | |
| 2011/0155810 A1 | 6/2011 | Taniguichi | |
| 2011/0177710 A1 | 7/2011 | Tobey | |
| 2011/0239220 A1 | 9/2011 | Gibson | |
| 2012/0099822 A1 | 4/2012 | Kuffel et al. | |
| 2012/0155810 A1 | 6/2012 | Nakagawa | |
| 2012/0189260 A1 | 7/2012 | Kowalczyk et al. | |
| 2012/0237177 A1 | 9/2012 | Minota | |
| 2012/0269485 A1 | 10/2012 | Haley et al. | |
| 2012/0301080 A1 | 11/2012 | Gniadek | |
| 2012/0308183 A1 | 12/2012 | Irwin | |
| 2012/0328248 A1 | 12/2012 | Larson | |
| 2013/0019423 A1 | 1/2013 | Srutkowski | |
| 2013/0071067 A1 | 3/2013 | Lin | |
| 2013/0089995 A1 | 4/2013 | Gniadek et al. | |
| 2013/0094816 A1 | 4/2013 | Lin et al. | |
| 2013/0101258 A1 | 4/2013 | Hikosaka | |
| 2013/0121653 A1 | 5/2013 | Shitama et al. | |
| 2013/0170797 A1 | 7/2013 | Ott | |
| 2013/0183012 A1 | 7/2013 | Cabanne Lopez et al. | |
| 2013/0216185 A1 | 8/2013 | Klavuhn | |
| 2013/0259429 A1 | 10/2013 | Czosnowski et al. | |
| 2013/0308915 A1 | 11/2013 | Buff | |
| 2013/0322825 A1 | 12/2013 | Cooke et al. | |
| 2014/0016901 A1 | 1/2014 | Lamboum et al. | |
| 2014/0023322 A1 | 1/2014 | Gniadek | |
| 2014/0050446 A1 | 2/2014 | Chang | |
| 2014/0056562 A1 | 2/2014 | Limbert | |
| 2014/0133808 A1 | 5/2014 | Hill et al. | |
| 2014/0169727 A1 | 6/2014 | Veatch et al. | |
| 2014/0219621 A1 | 8/2014 | Barnette, Jr. et al. | |
| 2014/0226946 A1 | 8/2014 | Cooke et al. | |
| 2014/0241644 A1 | 8/2014 | Kang | |
| 2014/0241678 A1 | 8/2014 | Bringuier et al. | |
| 2014/0241688 A1 | 8/2014 | Isenhour et al. | |
| 2014/0334780 A1 | 11/2014 | Nguyen et al. | |
| 2014/0348477 A1 | 11/2014 | Chang | |
| 2015/0003788 A1 | 1/2015 | Chen | |
| 2015/0111417 A1 | 4/2015 | Vanderwoud | |
| 2015/0177463 A1 | 6/2015 | Lee et al. | |
| 2015/0212282 A1 | 7/2015 | Lin | |
| 2015/0241641 A1 | 8/2015 | Lee | |
| 2015/0301294 A1 | 10/2015 | Chang et al. | |
| 2015/0331201 A1 | 11/2015 | Takano et al. | |
| 2015/0355417 A1 | 12/2015 | Takano et al. | |
| 2015/0370021 A1 | 12/2015 | Chan | |

(56) References Cited

U.S. PATENT DOCUMENTS

| | | |
|---|---|---|
| 2015/0378113 A1 | 12/2015 | Good et al. |
| 2016/0131849 A1 | 5/2016 | Takano et al. |
| 2016/0139343 A1 | 5/2016 | Dean, Jr. |
| 2016/0178852 A1 | 6/2016 | Takano |
| 2016/0291262 A1 | 6/2016 | Chang et al. |
| 2016/0195682 A1 | 7/2016 | Takano et al. |
| 2016/0231512 A1 | 8/2016 | Seki |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang et al. |
| 2017/0205590 A1 | 7/2017 | Suncall |
| 2017/0205591 A1 | 7/2017 | Takano et al. |
| 2017/0212313 A1 | 7/2017 | Elenbaas |
| 2017/0212316 A1 | 7/2017 | Takano et al. |
| 2017/0254961 A1 | 9/2017 | Kamada |
| 2017/0254966 A1 | 9/2017 | Gniadek et al. |
| 2017/0276275 A1 | 9/2017 | Beemer |
| 2017/0276887 A1 | 9/2017 | Allen |
| 2017/0343740 A1 | 11/2017 | Nguyen |
| 2018/0128988 A1 | 5/2018 | Chang |
| 2018/0156988 A1* | 6/2018 | Gniadek .............. H01R 13/743 |
| 2018/0172923 A1 | 6/2018 | Bauco |
| 2018/0217339 A1 | 8/2018 | Ma et al. |
| 2018/0252872 A1 | 9/2018 | Chen |
| 2018/0341069 A1 | 11/2018 | Takano |
| 2019/0204513 A1 | 7/2019 | Davidson |

FOREIGN PATENT DOCUMENTS

| | | |
|---|---|---|
| CN | 201383588 Y | 1/2010 |
| CN | 2026500189 U | 12/2013 |
| DE | 19507669 C2 | 10/1998 |
| DE | 202006011910 U1 | 3/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2000089059 A | 3/2000 |
| JP | 03752331 B2 | 3/2006 |
| JP | 2009229545 A | 10/2009 |
| JP | 2009276493 A | 11/2009 |
| JP | 04377820 B2 | 12/2009 |
| KR | 20090538 U | 6/2009 |
| KR | 1371686 B1 | 3/2014 |
| TW | 200821653 A | 5/2008 |
| WO | 2001/79904 A2 | 10/2001 |
| WO | 2001079904 A2 | 10/2001 |
| WO | 2004/027485 A1 | 4/2004 |
| WO | 2004027485 A1 | 4/2004 |
| WO | 2006007120 A1 | 1/2006 |
| WO | 2008/112986 A1 | 9/2008 |
| WO | 2009/135787 A1 | 11/2009 |
| WO | 2010/024851 A2 | 3/2010 |
| WO | 2010024851 A1 | 3/2010 |
| WO | 2012/136702 A1 | 10/2012 |
| WO | 2012136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015103783 A1 | 7/2015 |
| WO | 2015/191024 A1 | 12/2015 |
| WO | 2016019993 A1 | 2/2016 |
| WO | 2016/148741 A1 | 9/2016 |
| WO | 2019126333 A1 | 6/2019 |

OTHER PUBLICATIONS

International Search Report and Written Opinion, Application No. PCT/US20/37553, dated Sep. 10, 2020, pp. 11.

"Fiber Optic Connectors and Assemblies Catalog" 2009, Huber & Suhner Fiber Optics, Herisau, Switzerland, www.google.co.in/url?sa=l&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZVcvTujWH4ntrAfH-dXZCg&usg=AFQjCNE1MdC-4avewRJU6IDVc_WYbr0QQ.

"Fiber Optic Interconnect Solutions, Tactical Fiber Optic Connectors, Cables and Termini" 2006, Glenair, Inc., Glendale California, www.mps-electronics.de/fileadmin/files/MPS-E-Produkte/Katalog/Glenair/Katalog-Glenair-LWL-1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

Fiber Optic Connectors Tutorial, 2018, 20 pages.

Fiber Optic Glossary, Feb. 29, 2016, 93 pages.

PCT/IB2018/056133 Written Opinion dated Jan. 3, 2019.

PCY/IB/056133 Search Report dated Jan. 3, 2019.

Non-Final Office Action U.S. Appl. No. 16/035,695 dated Sep. 28, 2018.

Final Office Action, U.S. Appl. No. 16/035,691, dated Feb. 11, 2019, pp. 8.

International Search Report and Written Opinion for Application No. PCT/US2018/62406 dated Mar. 18, 2019, 11, pages, United States.

International Search Report and Written Opinion for Application No. PCT/US2019/40700 dated Sep. 27, 2019, 11 pages, United States.

International Search Report and Written Opinion for Application No. PCT/US2019/50895 dated Jan. 6, 2020, 11 pages, United States.

International Search Report and Written Opinion for Application No. PCT/US2019/56564 dated Jan. 14, 2020, 16, pages, United States.

International Search Report and Written Opinion, Application No. PCT/US2018/042202, pp. 17, dated Dec. 7, 2018.

International Search Report and Written Opinion, Application No. PCT/US19/46397, dated Nov. 12, 2019, pp. 6.

\* cited by examiner

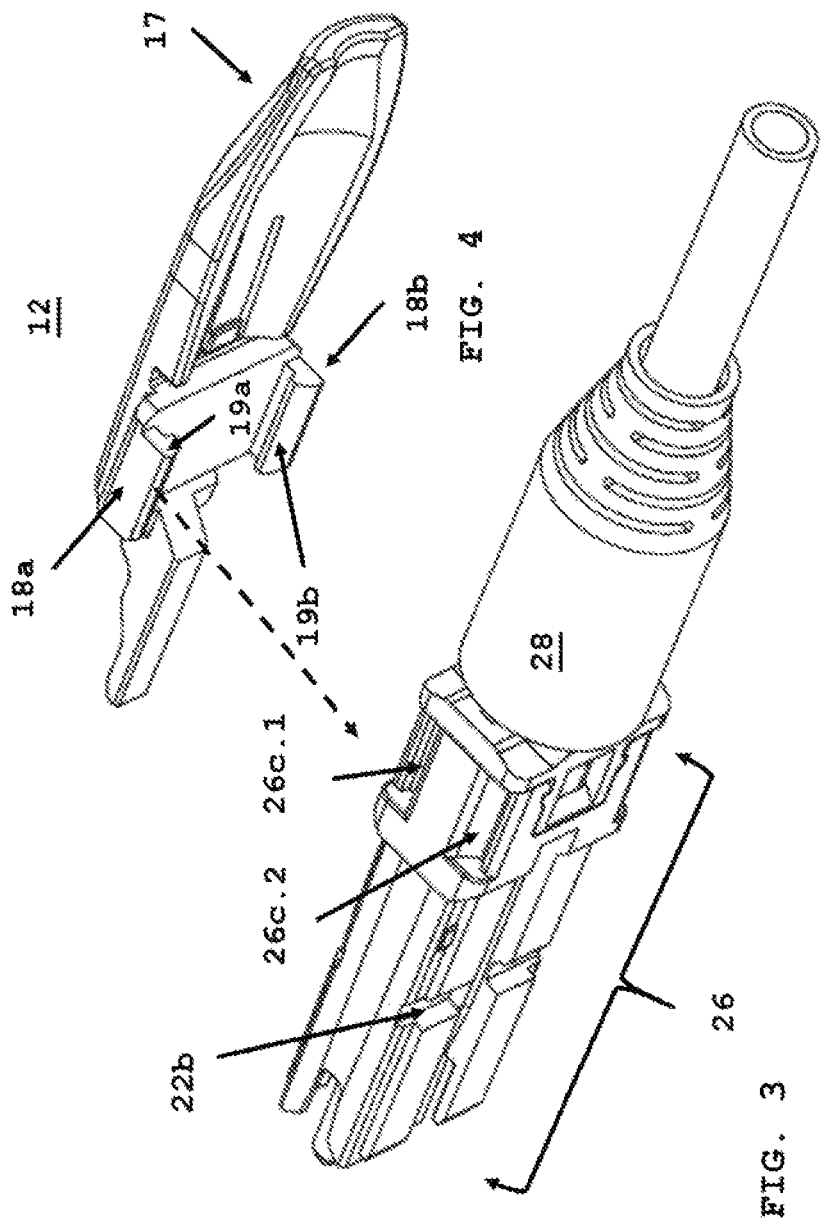

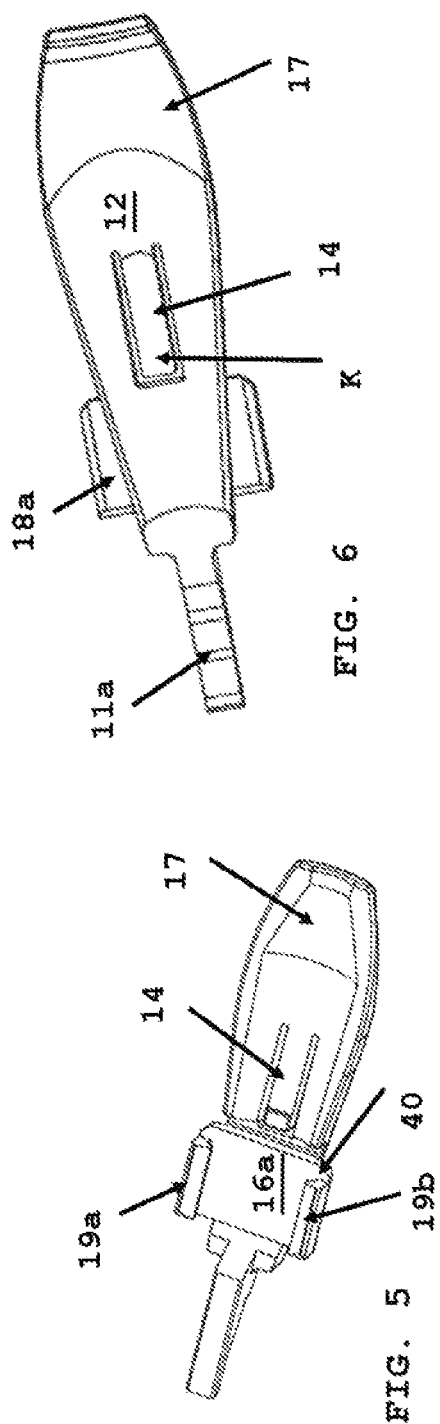

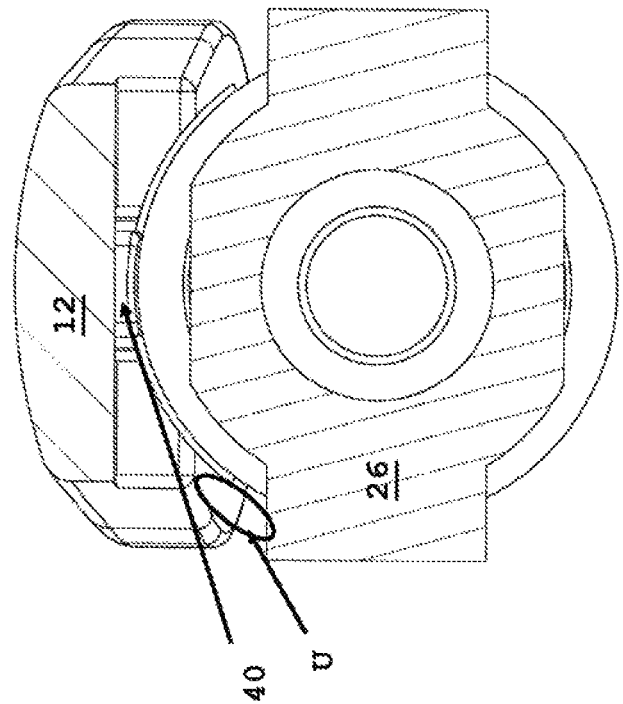
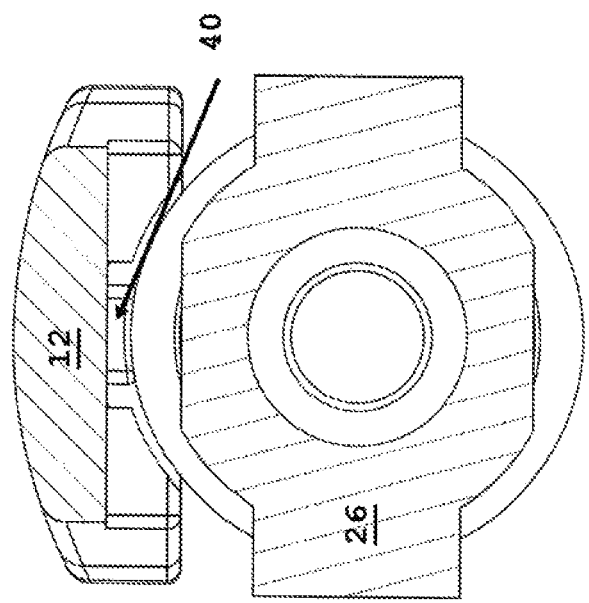

LEVER ACTUATED LATCH ARM FOR RELEASING A FIBER OPTIC CONNECTOR FROM A RECEPTACLE PORT AND METHOD OF USE

RELATED APPLICATION

This application claims the benefit of priority of U.S. Provisional Application No. 62/861,013 filed on Jun. 13, 2019, entitled "Lever Actuated Latch for Releasing a Fiber Optic Connector from a Receptacle", and is included herein by reference in its entirety.

FIELD OF INVENTION

The present disclosure relates generally to optical fiber connectors and systems, and specifically to fiber optic connectors with a release to disengage the connector from a receptacle port such as an adapter or transceiver. More specifically, the present disclosure relates to a release that when depressed distally of a pivot point, a hook that secures the connector within the port is rotated out of the connector body, and then connector can be removed from the port.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume, transmission speeds, and low losses. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device.

Prior release mechanisms include a pull tab, a rear pivot latch, slider latch or a cable boot release. A pull tab release is disclosed in U.S. Pat. No. 8,645,317B2, Gniadek, "Latching Connector with Remote Release". A rear pivot latch is disclosed by Panduit and based on industry standard FOCIS-10. In the Panduit disclosure, the pivot point is positioned on the outer housing of the connector. This results in a larger overall footprint for the connector than what is disclosed in the present invention. A slider latch release is disclosed in U.S. Pat. No. 7,329,137B2 Martin, "Modular Plug with Slider Latch". A cable boot release is disclosed in U.S. Pat. No. 10,634,854B2, Davidson, "Push-Pull Boot Connector for Fiber Optic Cables". Also disclosed in U.S. Pat. No. 8,550,728B2, Takahashi, "Method Connecting Optical Fiber of Optical Connector with Optical Transmission Element, Connector-Attached Optical Transmission Element, Optical Connector, and Assembling Method of Optical Connector".

SUMMARY

According to one aspect of the present disclosure, a latch lever release is releasably secured about a connector housing or housing that holds at least one ferrule further comprising at least one optical fiber. A pivot point is formed as part of the housing or beneath the main body of the latch lever release. Depressing the latch lever release at a trigger portion distal of the pivot point rotates up a proximal end latch lever release. This displaces an engagement member, such as a hook that is secured the connector within a port of a receptacle. Once the hook is displaced from within a recess or cut-out formed as part of the connector outer housing, the user can remove the connector from the port by pulling the connector rearward while continuing to depress the trigger portion. Here the pivot point is positioned between the main body of the latch lever release and the outer housing of the connector, which reduces the overall size or dimensions of the connector over the prior art described above in the background. The width of the connector is reduced and length of the connector is reduced in the present invention. This reduction in overall connector sized increases space utilization within an existing data center.

In another embodiment, the latch lever release further comprises a main body, the main body has opposing legs, and further wherein each leg has a hook at a distal end of each leg to secure the latch lever release about the housing. In another embodiment, the fiber optic connector is in a first polarity when the latch lever release is secured to a first side of the housing and the fiber optic connector is in a second polarity when the latch lever release is secured to a second side of the housing. The housing further comprises opposing cut-outs to accept the hook of each opposing leg thereby securing the latch lever release to the housing. The cut-out further comprises a chamfered leading edge to displace the hook before the hook is positioned within the cut-out, and further to allow the hook to be removed from the cut-out by lifting the latch lever release away from the housing.

The housing is made up of a front body and a backbody without departing from the present invention. The front body further comprises a recess or cut-out that accepts an engagement device to secure the connector by a hook within a port. A channel is formed within the front body, the channel is perpendicular to the widthwise recess and the channel is configured to accept a ramp release surface at the first end of the latch lever release. When the trigger portion of the latch lever release is depressed, the ramp release is rotated up displacing the hook from the recess.

In another embodiment, the latch lever release may deploy a return member. The return member biases the latch lever release to its original position when the trigger portion of the latch lever release is not depressed distal of the pivot point. The return member is made of a deformable plastic, sheet metal, or material having a spring constant (K) sufficient to bias the latch lever release to its original position.

In another embodiment of the present invention, a method of release the fiber optic connector from the receptacle; port comprise the steps of depressing the latch lever release thereby rotating up a proximal end of the latch lever release which displaces an engagement member out of a widthwise recess of the housing and then pulling the fiber optic connector in a distal direction while depressing the latch lever release until the fiber optic connector is removed from a receptacle port.

In another embodiment of the present invention, a latch lever release assembly, comprises a main body with opposing legs formed perpendicular to the main body. Each leg is configured with a hook. The opposing legs with hooks secure the latch lever release to a connector housing. A trigger end portion of the latch lever release is distal of a pivot point. The pivot point allows a first end of the latch lever release to rotate up when the trigger portion is depressed. This action displaces an engagement member within a recess formed in the housing to release a fiber optic connector from a port.

The foregoing, as well as additional objects, features and advantages of the present disclosure is apparent from the following detailed description, which proceeds with reference to the accompanying drawings.

BRIEF DESCRIPTION OF THE DRAWINGS

FIG. 3 is a view of the fiber optic connector without the latch lever release attached;

FIG. 4 is a perspective view of underside of the latch lever release;

FIG. 5 is an underside view of the latch lever release;

FIG. 6 is a top view of the latch lever release;

FIG. 7 is a side view of the latch lever release;

FIG. 14A is a front section view of the pivot point formed as part of the connector housing along section A-A of FIG. 10, and FIG. 14B us a front section view of the pivot point formed as part of the connector housing along section B-B of FIG. 12.

Corresponding reference numbers indicate corresponding parts throughout the figures.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

For connection of cables together or with other fiber optic devices, the terminal ends of a cable may include a connector. A "connector," as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, a straight tip (ST) connector, or a behind-the-wall (BTW) connector. The connector may generally be defined by a connector housing body. In some embodiments, the housing body may incorporate any or all of the components described herein.

Easily removing data centers connectors without touching the fiber optic cable is important to avoid optical fiber breakage. A one-step release and reducing the overall connector dimensional size is a time saver and reduces data center space use over prior art connectors.

Various parts, components or configurations described with respect to anyone embodiment above may also be adapted to any others of the embodiments provided. This disclosure is not limited to the particular systems, devices and methods described, as these may vary. The terminology used in the description is for the purpose of describing the particular versions or embodiments only, and is not intended to limit the scope.

Figure 1:
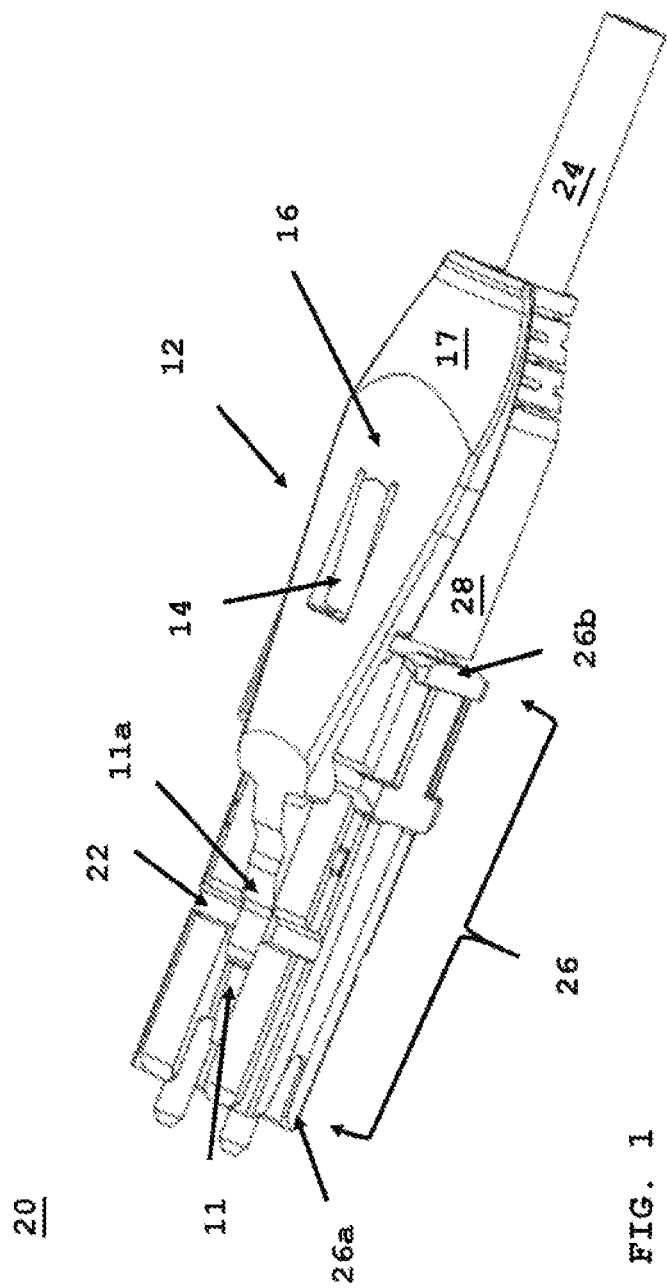
FIG. 1 is a perspective view of a fiber optic connector assembled with a latch lever release according to the present invention.

FIG. 1 depicts a fiber optic connector (20) assembled with latch lever release (12) on a first side of the housing (26). The latch lever release (12) is secured when opposing legs (18a, 18b) are positioned within opposing cut-outs (26c.1, 26c.2) formed as part of housing (26) (refer to FIG. 3). Housing (26) may be made up of front body (26a) and backbody (26b), A uni-body housing may be used with cut-outs, as described in FIG. 3, without departing from the scope of the present invention, as disclosed in U.S. Pat. Appl. US2018/0341069A1, Takano, "Adjustable Polarity Fiber Optic Connector Assemblies with Push-Pull Tabs", which is incorporated herein by reference. The housing (26) further comprises at least one optical ferrule (29) (refer to FIG. 2A) with at least one optical fiber therein provided by a fiber optic cable (24). A strain relief boot (28) is secured to a distal end of the housing. The boot (28) accepts the optical cable (24). The latch lever release (12) has a first end and a second end. The second end further comprises a trigger portion (17). The trigger portion (17) is slightly depressed to allow a user a tactile feel when depressing the trigger to remove the connector from a receptacle port as described below. A return member (14) may be used to bias the latch lever release (12) to an original position after the user released a force applied distal of a pivot point (40) (refer to FIG. 12). As described below, a force "D" will release the connector from an engagement device within a receptacle port. The underside of main body (16) further comprises the pivot point (40) as described in FIG. 5 below. The first end of the latch lever release (12) comprises a ramp release surface (11a), that aids in displacing the engagement member (27) from the connector, so the connector can be removed from a receptacle port formed as part of an adapter (30a) (refer to FIG. 10). A channel (11) formed in the housing (26) is configured to accept the ramp release surface (11a). The channel (11) is perpendicular to a recess (22) that accepts the engagement device when the connector is fully inserted into an adapter port (30a). The recess (22) may be widthwise across the connector front body (26a) or a cut-out elsewhere on the connector outer housing configured to accept an engagement device within the adapter port (30a), such as a hook or an anchor device (27a) (refer to FIG. 10).

Figure 2A:
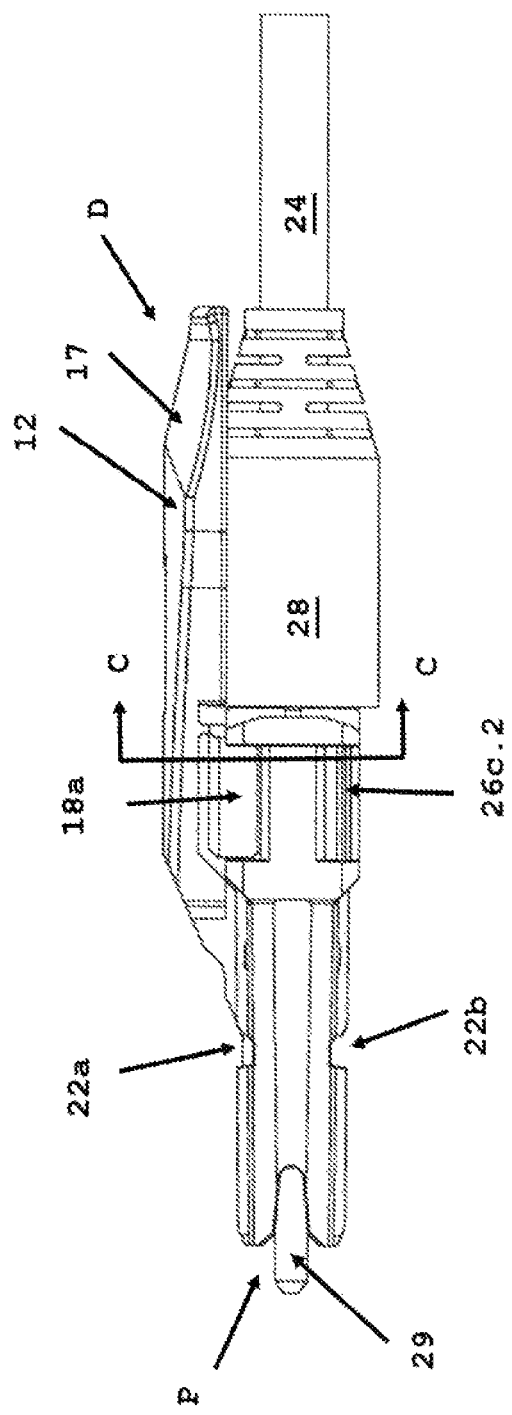
FIG. 2A is a perspective side view of a fiber optic connector of FIG. 1.
Figure 2B:
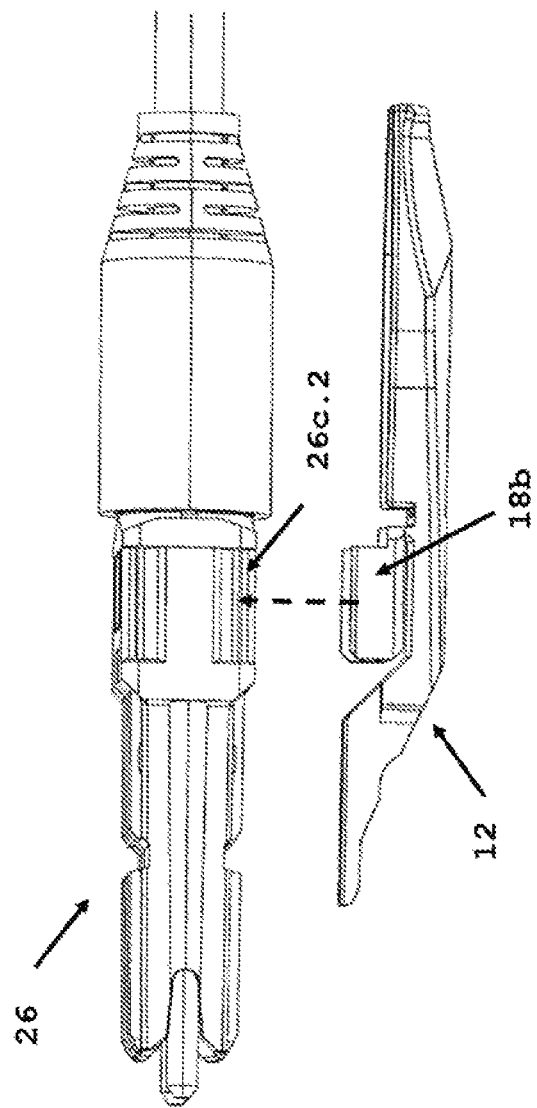
FIG. 2B is an exploded view of the connector of FIG. 1 prior to configuration in a second polarity position.

FIG. 2A depicts a side view of the connector (20) of FIG. 1. Ferrule (29) at the proximal end (P) of the connector (20) has at least one optical fiber provided by the optical cable (24). The cable (24) passes through the strain relief boot (28), at a distal end of the connector (D). Housing (26) has opposing recesses (22a, 22b) that allow the latch lever release (12) to be positioned on a first side of the housing within cut-outs (26c.1, 26c.4) (refer to FIG. 9). In FIG. 2A, the connector is a first polarity position, that is, when the connector is inserted into an adapter port (30a), the two ferrules (Tx (transmit, Rx (receive)) are in a first transmission configuration when opposing a second connector in an adapter (30) (refer to FIG. 10). As depicted in FIG. 2B, removing the latch lever release, and positioning on the second side of the housing, along dotted line, would secured the latch lever release (12) within cut-outs (26c.2, 26c.3) (refer to FIG. 9). The connector would be inserted into an adapter port in a second polarity or second transmission position, which rotated the connector 180 degrees.

Figure 9:
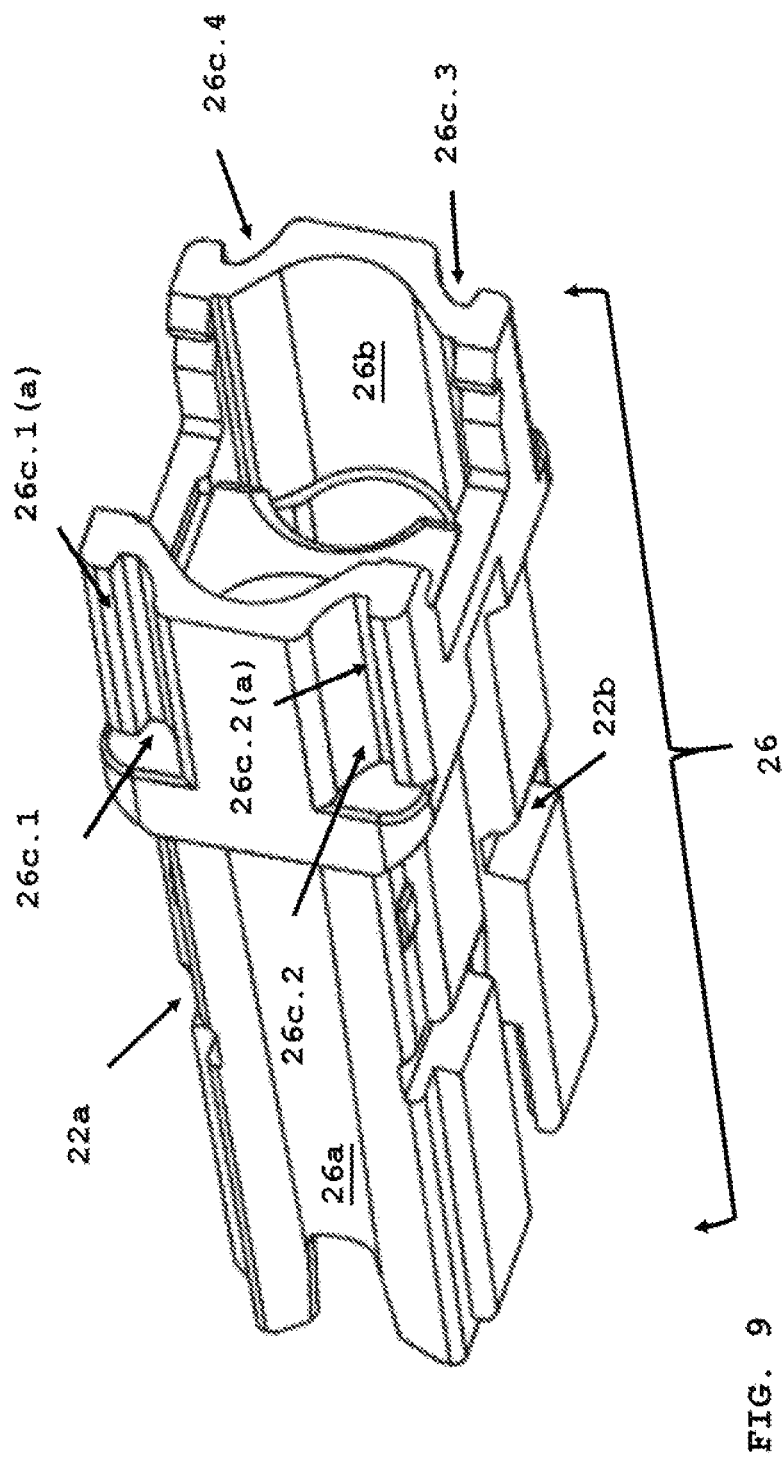
FIG. 9 is a perspective view of the connector housing.

FIG. 3 depicts a perspective view of the connector housing (26) without the latch lever release (12) (refer to FIG. 4) secured by opposing legs (18a, 18b) with hooks (19a, 19b) within cut-outs (26c.1, 26c.4) for a first polarity position, as shown in FIG. 1. Hooks (19a, 19b) are received within corresponding, opposing cut-outs (26c.1 26c.4; 26c.2, 26c.3) formed in the housing, as shown in FIG. 9. FIG. 4 depicts latch lever release (12) prior to securing to housing (26) with opposing legs (18a, 18b) and hooks (19a, 19b). The legs are perpendicular to the main body (16). The hooks (19a, 19b) are at a distal end of each opposing leg. Nearer the second end of the latch lever release (12) is trigger portion (17) described above.

FIG. 5, FIG. 6 and FIG. 7 depicts views of the latch lever release (12). FIG. 5 is an underside view of the main body (16). Each leg (18a, 18b) has a hook (19a, 19b), as described above. FIG. 6 depicts a top view of latch lever release (12) further comprising return member (14). Return member (14) biases the latch lever release (12) to its original position when the user force "D" is released at the trigger portion (17). The return member is formed of a material with a spring constant (K) sufficient to bias the latch lever release to its original position. The material may be a plastic, spring or sheet metal. The return member maybe formed as part of the housing without departing from the scope of the present invention. Referring to FIG. 7, pivot point (40) is formed on the latch lever release (12) when there is gap or space (40a) between the hooks of each leg (18a, 18b) and the underside (16a) of the main body (16). So when the trigger portion (17) is depressed "D" (refer to FIG. 12), and there is no pivot point (40) formed as part of the housing (26) (refer to FIG. 10), the legs are lifted slightly and contacts a surface underneath chamfered edge (26c.1(a)) of cut-out (26a.1) (refer to FIG. 9), and this contact acts as the pivot point allowing the first end ramp release surface (11a) (refer to FIG. 6) to rotate up, as described below in FIG. 10 to FIG. 12, that allows the ramp release surface to displace the engagement device securing the connector within a port (30a).

Figure 8:
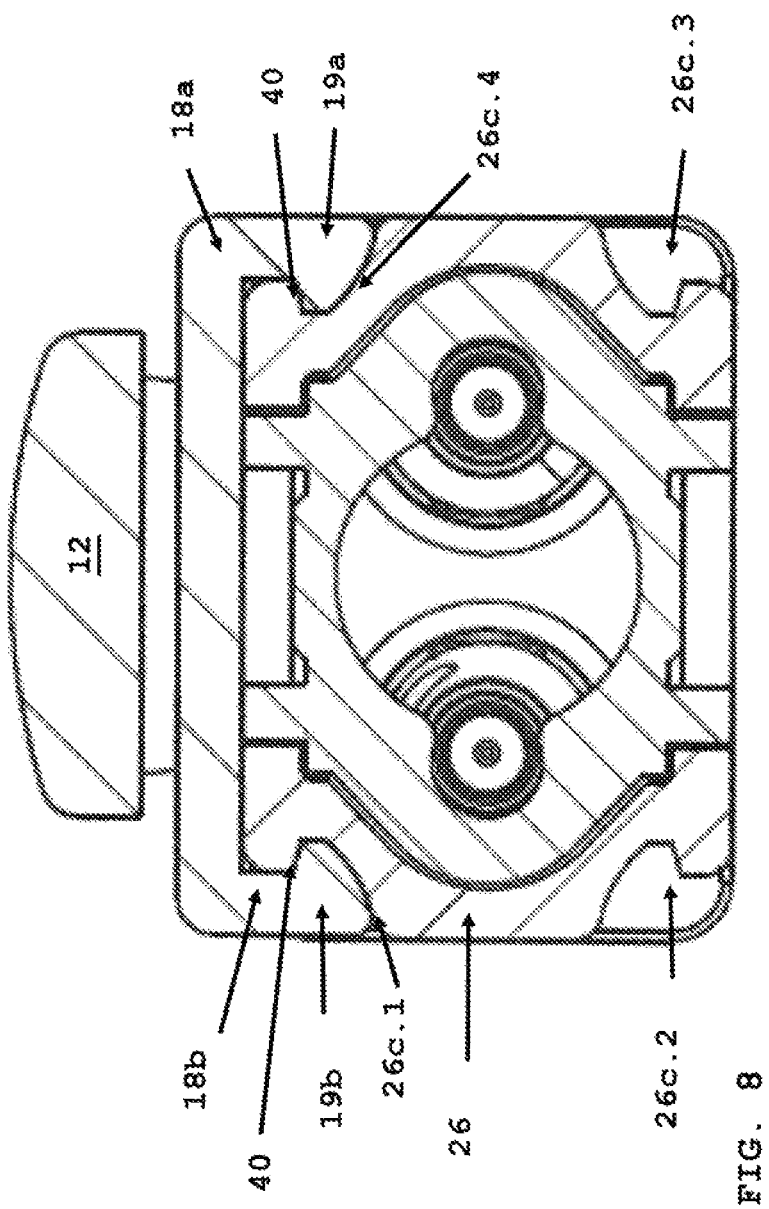
FIG. 8 is front cross-section view of the fiber optic connector assembled with the latch lever release.

FIG. 8 is a cross-section view along line C-C of FIG. 2A. Opposing legs (18a, 18b) am secured with cut-outs (26c.1, 26c.4). Hooks (19a, 19b) have engaged a corresponding chamfered edge (26c.1(a)-26c.4(a)) establishing the pivot point (40). FIG. 9 depicts housing (26) with a front body (26a) and backbody (26b). Cut-outs (26c.1-26c.4) are formed as part of the backbody (26b). The housing may be unibody as described above with the cut-outs formed as part of the unibody connector housing. Each cut-out has an opening or recess that accepts a leg hook (19a, 19b). Each cut-out has a chamfered edge (26c.1(a)-26c.4(a)). The chamfered edges act as a pivot point as described above. The chamfered edges also allow the latch lever release to be removed from a first side of the housing and secured to a second side of the housing without binding or jamming during polarity changes as described in FIG. 2A and FIG. 2B. Opposing recesses (22a, 22b) accept the engagement device when inserted into a port in first polarity or second polarity configuration.

Figure 10:
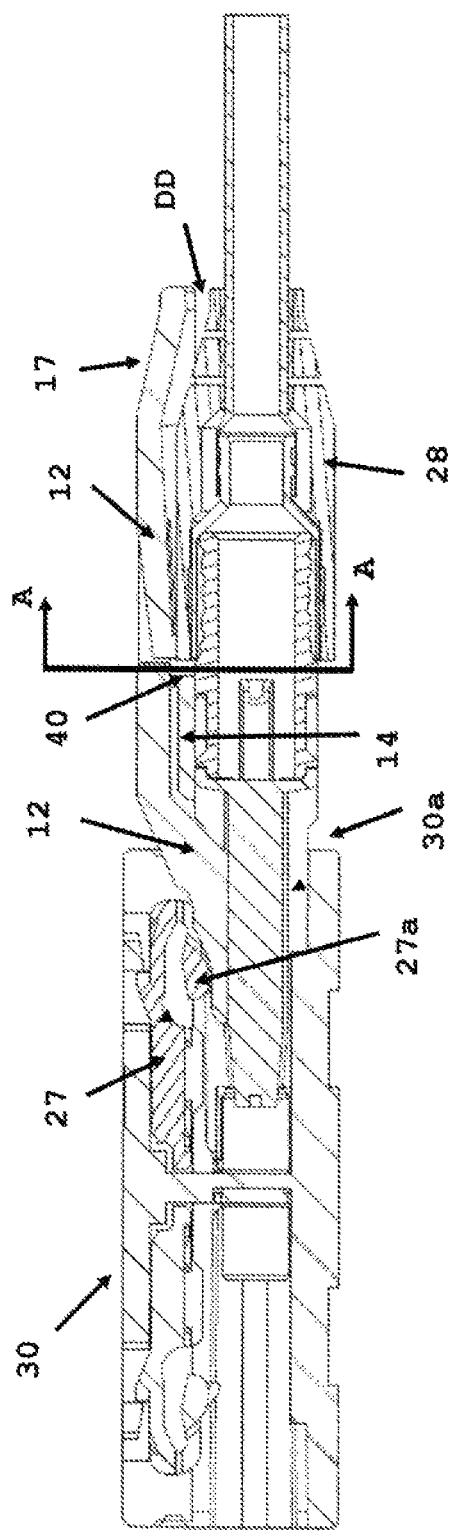
FIG. 10 is a cross-section view of inserting the connector into a port.
Figure 11:
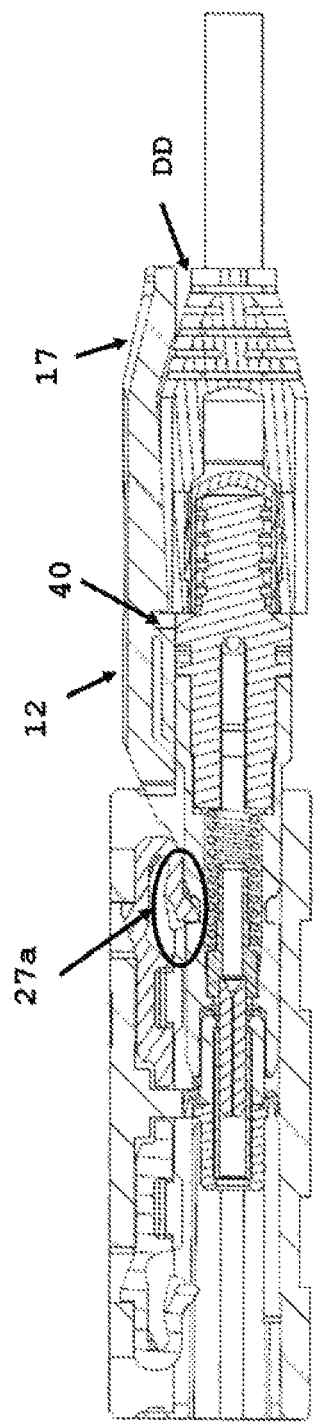
FIG. 11 is a cross-section view of the connector fully inserted into the port.

FIG. 10 depicts inserting connector (20) within port (30a) of the adapter (30). Engagement device (27) is being lifted by ramp release surface (11a), and once the connector is fully inserted, as shown in FIG. 11, the anchor device (27a) is secured with the recess (22a, 22b) depending on the polarity configuration of the connector. FIG. 10 further shows pivot point (40) is formed as part of the housing (26). When the latch release lever (12) is secured about the housing, and fully inserted, there is a distance "DD", that a distal end of the lever is above the strain relief boot (28). When the user depresses near trigger portion (17) or distal of the pivot point (40), where distal end is nearer the incoming optical cable, the first end of the latch lever release will rotate up as depicted in FIG. 12.

Figure 12:
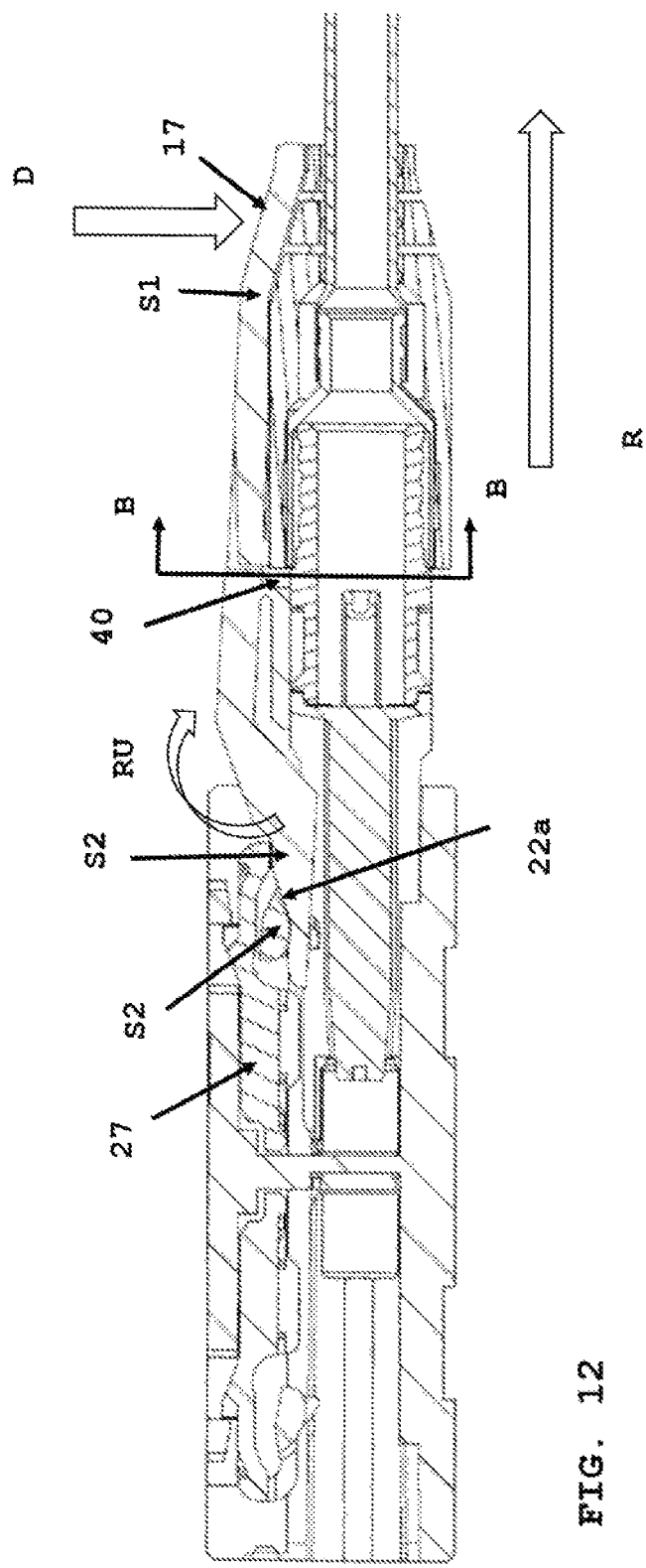
FIG. 12 is a cross-section view of removing the connector from the port.
Figure 13:
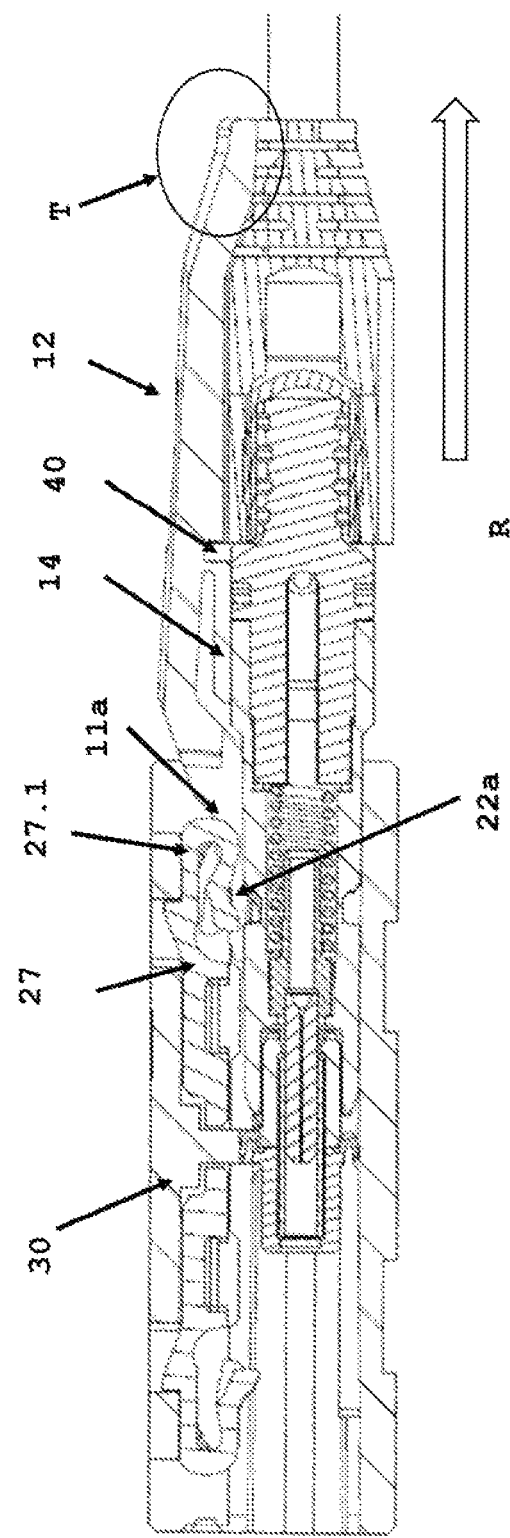
FIG. 13 is a cross-section view of the engagement device displaced from the connector housing releasing the connector from the port for removal.

FIG. 12 depicts a force "D" being applied near the trigger portion (17) as step 1 (S1) of removing the connector from the port. The first end of the latch lever release (12) rotates up in direction of "RU", and the ramp release surface displaces the engagement device (27) from the recess (22a, 22b). As the connector is being removed in the direction of arrow (R), the engagement device is displaced from the recess. The first end of the latch lever release (12) is rotating up about the pivot point (40) at step 2 (S2) as depicted in FIG. 12. FIG. 13 depicts the trigger portion fully depressed at call out (T), just prior to removing the connector in the direction of "R". In FIG. 13, a middle arm (27.1) of the anchor device (27) is positioned against release ramp surface (11a) and within recess (22a).

FIG. 14A depicts a cross-section along A-A of FIG. 10 when the connector is fully inserted into the port, and prior to depressing the latch lever release (12) near trigger portion (17) or distal of the pivot point (40). FIG. 14B depicts a cross-section along B-B of FIG. 12. The latch lever release (12) is deflected slight upward, at "U", as the lever rotates about pivot point (40).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Various of the above-disclosed and other features and functions, or alternatives thereof, may be combined into many other different systems or applications. Variations or improvements therein may be subsequently made by those skilled in the art, each of which is also intended to be encompassed by the disclosed embodiments.

The invention claimed is:

1. A fiber optic connector, comprising:
 a housing further comprising at least one optical fiber, the housing having a proximal end and a distal end spaced apart along a longitudinal axis, the proximal end of the housing being spaced apart from the distal end of the housing in a proximal longitudinal direction, the housing holding the at least one optical fiber such that the at least one optical fiber is exposed through the proximal end of the housing for making an optical connection when the proximal end of the housing is plugged into a port;
 a latch lever release releasably secured to the housing, the latch lever release operating about a pivot point; and
 the latch lever release having a proximal end and a distal end spaced apart along a longitudinal axis, the proximal end of the latch lever release being spaced apart from the distal end of the latch lever release in the distal longitudinal direction, wherein the pivot point allows the proximal end of the lever release to rotate up and away from the housing thereby releasing an engagement member securing the fiber optic connector within the port by lifting the engagement member up and away from the housing.

2. The fiber optic connector according to claim 1, wherein the latch lever release further comprises a main body, the main body has opposing legs, and further wherein each leg has a hook at a distal end of each leg to secure the latch lever release about the housing.

3. The fiber optic connector according to claim 2, wherein the fiber optic connector is in a first polarity when the latch lever release is secured to a first side of the housing and the fiber optic connector is in a second polarity when the latch lever release is secured to a second side of the housing.

4. The fiber optic connector according to claim 3, wherein the housing further comprises opposing cut-outs to accept the hook of each opposing leg thereby securing the latch lever release to the housing.

5. The fiber optic connector according to claim 4, wherein the cut-out further comprises a chamfered leading edge to displace the hook before the hook is positioned within the cut-out, and further to allow the hook to be removed from the cut-out by lifting the latch lever release away from the housing.

6. The fiber optic connector according to claim 2, wherein the main body further comprises a return member or the housing further comprises a return member.

7. The fiber optic connector according to claim 6, wherein the return member biases the latch lever release to its original position when a trigger portion is not depressed distal of the pivot point.

8. The fiber optic connector according to claim 7, wherein the return member is made of a deformable plastic, sheet metal, or material having a spring constant (K) sufficient to bias the latch lever release to its original position.

9. The fiber optic connector according to claim 1, wherein the engagement member is a hook.

10. The fiber optic connector according to claim 9, wherein the hook is formed as part of an anchor device.

11. The fiber optic connector according to claim 1, wherein the pivot point is located on the latch lever release or the housing, and further wherein the pivot point is between the latch lever release and the housing.

12. The fiber optic connector according to claim 11, wherein the pivot point is an arch, protrusion, bump, or fulcrum.

13. The fiber optic connector according to claim 1, wherein the housing comprises a recess for receiving the engagement member and wherein the recess is a widthwise recess formed within a front body.

14. The fiber optic connector according to claim 13, wherein a channel is formed within the front body, the channel is perpendicular to the widthwise recess and further wherein the channel is configured to accept a ramp release surface at the first end of the latch lever release.

15. A fiber optic connector resulting in the configuration of claim 1.

16. A method of releasing a fiber optic connector, comprising the steps of:
 providing a fiber optic connector according to claim 15;
 depressing the latch lever release thereby rotating up the proximal end of the latch lever release which displaces an engagement member out of a widthwise recess of the housing; and pulling the fiber optic connector in a distal direction while depressing the latch lever release until the fiber optic connector is removed from a receptacle port.

17. The method according to claim 16, wherein a return member biases the latch lever release to its original position when there is no downward force applied to the latch lever release distal of the pivot point.

18. A latch lever release assembly, comprising:
a main body with opposing legs formed perpendicular to the main body;
a hook is configured at a distal end of each opposing leg;
the opposing legs secure the latch lever release to a housing;
a trigger portion is formed as part of the latch lever release, and the trigger portion is distal of a pivot point; and wherein the pivot point allows a first end of the latch lever release proximal of the pivot point to rotate up and away from the housing when the trigger portion is depressed whereby the first end of the latch lever lifts an engagement member out of a recess of the housing so the connector is releasable from a port.

19. The latch lever release assembly according to claim 18, wherein each hook is secured within a cut-out formed on opposing side of the housing.

20. The latch lever release assembly according to claim 19, wherein the housing further comprises at least one ferrule with at least one optical fiber therein.

* * * * *